US006585896B2

(12) United States Patent
Silverstone et al.

(10) Patent No.: US 6,585,896 B2
(45) Date of Patent: Jul. 1, 2003

(54) METHODS AND APPARATUS FOR MOLECULAR INDUCTION TECHNOLOGY TO CREATE CHANGES IN THE ENERGETIC CHARACTERISTICS OF VARIOUS MATERIALS, AND THEIR USE IN THE PRODUCTION OF MOLECULAR CHANGES IN OTHER MEDIA

(76) Inventors: Leon M. Silverstone, c/o 21$^{st}$ Century Innovative Products, LLC, 905 Armstrong St., Algonquin, IL (US) 60102; Fred M. Slingo, c/o 21$^{st}$ Century Innovative Products, LLC, 905 Armstrong St., Algonquin, IL (US) 60102

( * ) Notice: Subject to any disclaimer, the term of this patent is extended or adjusted under 35 U.S.C. 154(b) by 0 days.

(21) Appl. No.: 09/834,430

(22) Filed: Apr. 13, 2001

(65) Prior Publication Data

US 2002/0144956 A1 Oct. 10, 2002

Related U.S. Application Data

(60) Provisional application No. 60/274,413, filed on Mar. 9, 2001.

(51) Int. Cl.$^7$ .................................................. C02F 1/30
(52) U.S. Cl. ...................... 210/748; 210/695; 210/175; 204/158.2
(58) Field of Search ................ 210/748, 695, 210/175; 204/158.2

(56) References Cited

U.S. PATENT DOCUMENTS

| | | |
|---|---|---|
| 3,941,670 A | 3/1976 | Pratt |
| 4,115,280 A | 9/1978 | Pratt |
| 4,161,436 A | 7/1979 | Gould |
| 4,843,752 A | 7/1989 | Munemasa et al. |
| 4,872,458 A | 10/1989 | Kanehira et al. |
| 5,039,865 A | 8/1991 | Koji |
| 5,044,346 A | 9/1991 | Tada |
| 5,507,943 A * | 4/1996 | Labrador |
| 5,562,820 A * | 10/1996 | Taoda et al. |
| 5,686,781 A | 11/1997 | Kim |
| 5,769,971 A | 6/1998 | Kuroda et al. |
| 5,928,784 A | 7/1999 | Sugihara et al. |
| 5,942,125 A * | 8/1999 | Englehard et al. |
| 5,948,272 A * | 9/1999 | Lemelson |
| 6,004,588 A | 12/1999 | Torii et al. |
| 6,026,330 A | 2/2000 | Chuang |
| 6,119,683 A * | 9/2000 | Nakauchi |
| 6,355,398 B1 * | 3/2002 | Fromson et al. |

OTHER PUBLICATIONS

*Motor Trend*, Jul. 1980, "Miracle Mileage: We still don't believe it" by Chuck Nerpel and Peter Frey.
*Trailer Life*, Sep. 1980, "The Moleculetor: Is this the first genuine mileage 'miracle'?" by Bill Estes.

* cited by examiner

*Primary Examiner*—Betsey Morrison Hoey
(74) *Attorney, Agent, or Firm*—Bell, Boyd & Lloyd LLC (57) ABSTRACT

A process and an apparatus are provided for altering the biological, chemical, and molecular activity of primary materials, such as metals and ceramics, in order to confer atypical energetic effects on the so-altered primary materials. Such primary material is bombarded by varying frequencies of energy from an array of sources, causing vibrational excitation of the primary material at the molecular level which changes the molecular nature of the so-treated material. The primary material is then effective in altering the biological, chemical, and molecular activity of secondary materials brought in close proximity thereto. The invention sets forth a process and apparatus for producing water-purifying tools and a process and apparatus for purifying water.

27 Claims, 4 Drawing Sheets

METHODS AND APPARATUS FOR MOLECULAR INDUCTION TECHNOLOGY TO CREATE CHANGES IN THE ENERGETIC CHARACTERISTICS OF VARIOUS MATERIALS, AND THEIR USE IN THE PRODUCTION OF MOLECULAR CHANGES IN OTHER MEDIA

This application claims the benefit of the earlier filed Provisional Application Ser. No. 60/274,413; filed Mar. 9, 2001.

BACKGROUND OF THE INVENTION

It is known that all matter in the universe takes the form of particles. Atoms are composed of heavy particles in the nucleus with lighter weight particles, or electrons, orbiting around the nucleus of the atom. The particles are discrete, individual and indivisible units, and are referred to as quanta. Quanta interact when in close proximity. Just as earlier scientific theory has indicated that light, which is composed of individual particles called photons, exhibits wave-like properties, so too do atoms, which exhibit the phenomenon of absorbing and radiating energy discontinuously, rather than in a continuous manner. The energetic characteristics of the molecules of a given substance are thus based on the arrangement and interaction of the atomic particles, or quanta, forming the molecules of the substance.

This explanation of the energetic characteristics of matter is known as quantum theory or quantum mechanics. From that theory, it can be understood that a change in molecular structure or arrangement can impact and change the energetic characteristics of a substance. It has also been postulated that exposure to electromagnetic radiation can also alter the chemical and biologic properties of substances.

The present inventor has developed a process and apparatus for effecting changes in the molecular structure of a primary material, such as metal and ceramics, to induce atypical energetic attributes in such material. Further, it has been discovered that the primary material in which the molecular structure has been altered can be used to impart similar molecular changes in secondary substances that come into close proximity to the altered primary material. One example of such usage is to use the primary altered material to treat and purify water.

SUMMARY OF THE INVENTION

A process and an apparatus are provided for altering the biological, chemical, and molecular activity of primary materials, such as metals and ceramics, in order to confer atypical abilities and energy effects on the so-altered primary materials. The primary material to be treated is vibrated at high speed and is then exposed to an array of varying energy types at varying frequencies. Electrical, magnetic, electromagnetic and thermal energy may be employed in effecting molecular change, and the primary material may also be exposed to light in the far-infrared range and laser radiation, as well. Such exposure causes vibrational excitation of the primary material at the molecular level and a change in the rotational states of the electrons of the atoms forming the molecules of the primary material. The molecular changes caused by exposure to the process of the present invention changes the energetic nature of the so-treated primary material.

The primary material is then effective in altering the biologic, chemical, and molecular activity of secondary materials brought in close proximity thereto. An example of the use of the apparatus and process of the present invention is to employ the treated primary material in a process and apparatus for purifying water.

An apparatus for inducing these molecular changes employs a high power output, including frequencies that excite vibrational and rotational states of the treated materials at an intensity sufficient to activate the materials to a level such that molecular and ionic bonds that determine the spatial character and biologic activity of materials be irreversibly changed to such extent that the materials assume different energy characteristics relative to their pre-treatment states.

The apparatus employs a high power output, including frequencies that can excite vibrational and rotational states of the treated materials at an intensity sufficient to activate the materials to dislodge electrons from quantum shells surrounding the nucleus of the atom and displace them into quantum shells different from those in which the electrons orbited in the primary material prior to treatment.

Material that is molecularly changed by the process and apparatus according to the invention is referred to as "molecularly changed work material" or just "work material" or "primary material." Material that is molecularly changed by being exposed to molecularly changed work material is referred to as "molecularly changed substance" or "secondary material." Inducing the molecular changes in primary materials using the invention is a complex, energy dependant, and time-consuming process. However, use of primary material, once they have been molecularly changed, so as to induce secondary molecular changes in other materials, is a relatively simple process whereby gases, fluids or solids are brought into close interfacial contact with the primary material. The effective operating principal of inducing the molecular changes in the secondary material is the implosion of subtle electromagnetic energy fields emanating from the primary material.

In a broad sense, the invention is directed to the restructuring of molecules into spatial characteristics with altered atomic configurations. The altered materials are modified with respect to the shifting of electrons from one quantum shell to another, thereby irrevocably altering the molecular, chemical or biological structure of the material in such a manner as to affect other materials brought into close proximity.

One example of material that can be molecularly changed by the inventive process and apparatus disclosed herein is a far-infrared (FIR) ray-emitting material. Preferably, such material comprises ceramic beads or spheres having diameters varying from 0.1–1.5 inches, or small cubes or hexagons with sides varying from 0.5–2.5 inches, or as plates or discs having dimensions or diameters of up to three feet with a thickness of at least one inch.

The ceramic material can be composed of a core material having an ultra fine powder of one or more compounds selected from alumina hydrate, silica hydrate, alumina, silica, and silicate adhered to the core material. This material itself, or combined with other substances, can provide far-infrared radiation to various objects to effect excitation vibration of molecules of solids, liquids or gases in the materials so exposed, thus aiding in the production of both primary molecular changes, and secondary molecular changes.

A far-infrared radiating material can be obtained by methods such as by pulverizing natural stone which has been absorbing solar energy for a geologically long time period, emitting far-infrared radiation of the wavelength 4–14 $\mu$m and comprising at least about 20% of Si, about 15% of Al, about 10% of K and about 5% of Fe, and forming the materials into spheres or other geometric shapes as already described.

The infrared laser radiation process is accomplished by sweeping the laser beam over the surface of the primary material to be molecularly changed. If sweeping the beam is deemed not to be sufficient to adequately cover the surface of the primary material, highly reflective mirrors or surfaces of reflecting plates can be used, and/or the specimen can be moved or rotated. In this manner, the entire surface of the specimen can be covered.

Molecular changes in the primary material are produced by the interaction of all of the energy components acting on the primary material as described in the invention, under conditions described in the invention. However, different degrees of molecular changes can be induced in the primary material by the use of separate components of the invention, such as for example, far-infrared radiation, used either alone or in various combinations with the other energy sources described in the invention.

Metal or ceramic devices in which primary molecular changes have been induced using the process and/or apparatus of the invention are then employed as molecular change-inducing tools to create secondary molecular changes in secondary materials, e.g. water. The primary material must be re-exposed to the molecular change-inducing apparatus of the invention at various time intervals in order to be "recharged."

The time interval necessary for recharging primary materials by re-inducing primary molecular changes will depend on many parameters such as the original degree of primary molecular changes induced in the material, the activity to which it has been applied as a molecular change-inducing tool, and the length of time that the molecular change-inducing tool has been in service. Notwithstanding these variables, it is expected that molecular change-inducing tools will maintain their viability for a period of at least six to twelve months.

Primary material can bring about secondary molecular changes in other secondary materials provided the secondary material is brought into close proximity with the primary material created or enhanced by the invention. This relationship can have significant benefits in a number of fields related to medicine, industry and commerce.

With respect to unaltered secondary materials, particularly liquids and gases, pulses of energy from primary material, brought into close contact with the as yet unaltered secondary material, affect secondary materials so as to alter the molecular, chemical or biologic structure of the secondary material, referred to as a process of inducing secondary molecular changes.

The use of primary material molecularly changed through the use of the process and apparatus described above to induce changes in secondary material or substances can have far ranging uses. Examples of the use of energy radiated by molecularly changed primary material include use of the primary material or secondary substances or material in biological treating apparatus for plants or animals, including humans, and use of the primary material or secondary substances or material in thermal apparatus including hairdryers, and lamps for treating living tissue, as, for example, in saunas.

A specific example of the use of primary material altered to radiate energy is the use of such material in "molecular purification" processes, for example, to cleanse contaminated water in order to make it potable. This can be carried out at the industrial level in terms of cleaning contaminated water brought up from below ground as well as to devices used at the household level to clean and remove contaminants and foreign ions from tap water. It can also be used for maintaining "clean" water in swimming pools and hot tubs without the necessity for adding chemicals, as is the current standard practice. The technology has many other applied technology applications and beneficial effects whereby contaminants are removed, materials are made more energetic and reactive, and the growth of organisms such as bacteria, fungi and algae is suppressed or inhibited.

For example, when water is the secondary material treated by exposure to radiated energy from the primary materials, clusters of water molecules are disassociated. Thus, impurities existing within such water clusters can be removed by exposing the water to the primary material. The impurities are precipitated from the water, whereby the water is purified. For example, water contaminated with such gases as sulfurous acid gas, hydrochloric acid gas, carbonic acid gas, and so on, which lie inside the water clusters, is purified by the application of radiated energy since the radiated energy cleaves the clusters, and thus the gases are released therefrom. Also, for the case of contamination of water with heavy metals such as mercury, cadmium, and so on, the application of the radiation causes the dissociation of the clusters which include such metals, and consequently these metals precipitate. The water is purified, simply by removing the precipitates from the water.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

While this invention is susceptible of embodiments in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
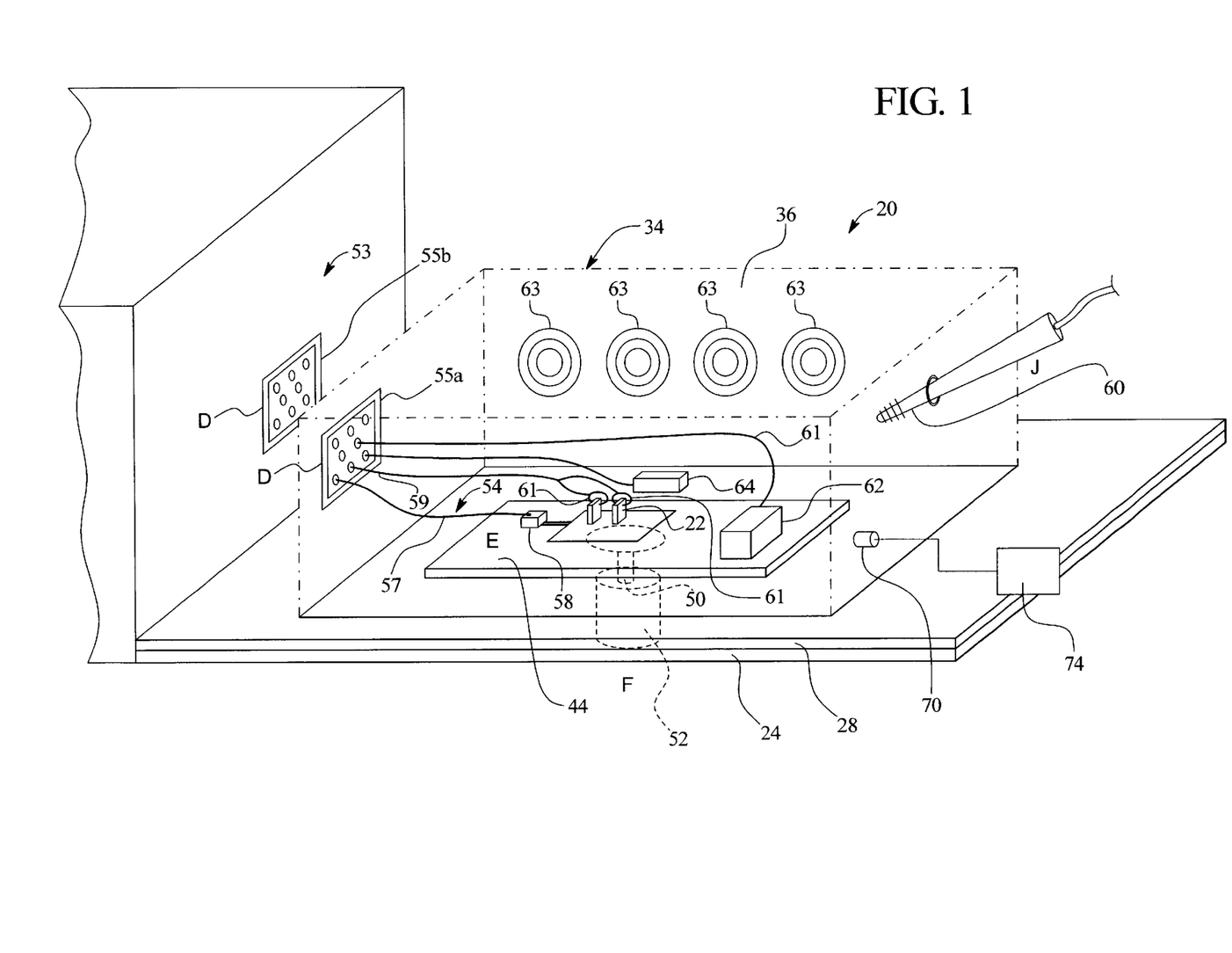
FIG. 1 is a diagrammatic perspective view of a molecular change-inducing apparatus of the present invention.

FIG. 1 illustrates an exemplary embodiment molecular-change inducing apparatus 20 used to induce molecular changes in a work material, tool or device, or "primary material" 22 introduced therein.

The apparatus 20 includes an insulated sub-base 24 measuring about, but not limited to, 4 inches in thickness and 6 ft in length and 4 ft in width. An insulating block of about four inches in thickness of solid electrically insulating material is used as a base 28 and having substantially the same dimensions as the insulated sub-base 24 to which it is attached.

A plexi-glass chamber 34 of at least two inches in thickness is affixed to the base 28. The dimensions of the chamber 34 are about 4 ft in length, 2.5 ft in width, and 18 inches in height. The chamber 34 may require strengthening along its dimensions with rigid struts or the like in order to maintain integrity when under vacuum. The chamber 34 is constructed with airtight seals so that it can be vacuuated. It has a removable top 36 for specimen access which is affixed to the main body of the chamber 34 with an airtight seal employing a suitable gasket and means of closure such as thumb screws (not shown).

An insulated specimen table 44 with suitable clamps (not shown) is contained in the center of the chamber 34. The specimen table 44 is constructed from the same insulating material used in the base 28 of the apparatus and is about 30 inches in length, 18 inches in width. The specimen table 44 is mounted on an axle or shaft 50 which passes through the chamber 34 and is connected to a vibration motor 52 so that the primary material specimen 22 can be vibrated at high speed while it is under energetic bombardment. Where the axle 50 passes through the chamber 34 adequate seals must be provided to ensure it will be vacuum-tight.

A power generation assembly 53 is located adjacent to the chamber 34 and will be large in size in order to house the components necessary to generate the power requirements of the invention. Alternatively, the power generation assembly, or assemblies, may be housed in an adjacent separate housing or room since it must accommodate large and high-powered equipment capable of generating and delivering the necessary power to the specimen. All power leads bringing supply to the chamber will be connected to the outer aspect of a connector plate 55a located in the wall of the chamber using suitable connectors such as Lemo or Reddel connectors, from a corresponding plate 55b on the power generating assembly 53. Power will be brought into the chamber to the specimen table 44 via connectors/leads 54 attached at the inner aspect of the connector plate 55a using similar connectors to those used on the external surface. Power cables 57 inside the chamber terminate in conducting clamps 58 for attachment to the specimen on the specimen table so as to apply the generated electrical energy directly to the primary material undergoing treatment. The power generation assembly 53 must be able to produce a powerful electromagnetic field within the chamber.

A high magnetic background field such as 12,000 gauss and up, and high field gradients of the order of at least 1300 kilogauss per centimeter are employed using electromagnets 62. A suitable array of electromagnets 62 are placed within chamber 34 surrounding the specimen table 44 to generate the magnetic background field. Electrical energy is supplied to electromagnets 62 from the power generation assembly through the use of conventional cabling 61. A far-infrared (FIR) light field of high intensity, provided by FIR radiators 63 is arranged surrounding the chamber so that the specimen table 44 will come under FIR bombardment. The FIR output wavelength will be in the ideal range of 4–20 $\mu$m but a wider spectrum of 4–1000 $\mu$m is acceptable.

Laser radiation is directed into a light pipe 60 to be reflected, if necessary, by one or more mirrors or highly reflective plates (not shown) pivotally attached to the light pipe. The light pipe can be moved along its axis or rotated about its axis. High energy infrared laser radiation sources employed can be a $CO_2$ laser adapted to radiate principally at 10.6 $\mu$m and 9.6 $\mu$m; or a CO laser adapted to radiate at many frequencies between 5–6.2 $\mu$m; or a YAG:Nd.$^{+3}$ solid-state laser adapted to radiate at about 1 $\mu$m. The amplitude of radiation emitted by the laser can be also controlled and the output radiation frequency from the particular laser employed can be modulated and filtered to produce substantially one determined frequency.

When undergoing treatment using the process and apparatus disclosed herein, the temperature of the specimen 22 should be within the range of 0–200 degrees F. In some circumstances it may be necessary to initially cool or freeze the specimen prior to commencing the process. A thermocouple (not shown) should be supplied to attach to the specimen 22 to monitor the temperature of the specimen 22. The output signal of the thermocouple can be supplied to a printer/recorder to record the temperature of the specimen 22 during the treatment. The thermocouple output signal can also be supplied to a suitable dial gauge or LED readout interface to allow monitoring of the temperature of the specimen 22 during the treatment process.

When the FIR radiators 63 are used during the treatment process, the thermal energy produced by the radiators 63 should be sufficient to heat the specimen 22 to the desired temperature. A heating source 64 may be provided within the chamber 34 to insure that the desired temperature of the specimen 22 is maintained when the FIR radiators 63 are not employed during treatment of the specimen 22, or as an auxiliary source of thermal energy.

The electrical energy provided by the power generating assembly 53 to the primary material 22 via cables 57, 59 and clamps 58, 61, respectively, has variable voltage which is independently controlled, with such voltage preferably in the range 5–100K volts. The electrical energy can alternately have variable current which is independently controlled, preferably in the range of 5 mA–50K amperes. The electrical energy has variable frequency which is independently controlled, preferably in the range 0.1 Hz to 100 GHz.

The application of the above-described energy to the specimen 22 should take place in a vacuum. In order to create the vacuum within the chamber 34, a connector 70 with an open/close tap for use in the creation of a vacuum in the chamber is supplied. A suitable vacuum pump 74, such as a 3 hp staged unit, capable of creating a vacuum of $1 \times 10^{-4}$ Torr. within chamber 34, is connected to connector 70.

All of the above parameters are independently controlled and the specimen 22 can be exposed to any or all of the above, and at any step in the output ranges specified. Output parameters should be recorded using suitable means such as computers, calibrated charts or printers, and may be monitored during the process through the use of conventional meters and/or LED readouts.

In order to carry out one exemplary process of the invention, a steel specimen having a mass of 10 lbs is subjected concurrently to the outputs according to the schedules given below. The outputs are ramped-up evenly during a portion of, or all of, each time segment. Alternate metals which can be used are aluminum and chromium cobalt.

The specimen is radiated with Far Infrared radiation (FIR) as a constant output, whereby the radiation emitted is fixed within the frequency range of 4–1000 $\mu$m. The FIR radiators are activated at the commencement of the process and are left on and remain constant throughout the process. The specimen is subjected to constant vibration at about 30 Hz throughout the process.

The specimen is heated from room temperature (approximately 65 degrees F.) to a temperature of about 200 degrees F.

The specimen is subjected to a vacuum environment of up to $1 \times 10^{-4}$ Torr during the first, third, and fifth hour of the process, each time period lasting sixty minutes.

The specimen is charged with electrical energy, the voltage and current are ramped up according to the schedule shown in the appropriate table below. The sequence takes place over a 15-hour time period. The frequency and corresponding magnetic energy ramp-up are also included in the table.

With respect to high energy infrared laser radiation, this process is introduced at the second, fourth, sixth and eighth hour of the process, with each radiation period continuing for a sixty minute period, employing the frequency ranges specified.

While the above output schedule can be taken as one approach to inducing molecular change of a particular specimen, in other circumstances the individual outputs may be varied according to other schedules not specified herein.

| Voltage (v) | Frequency (Hz) | Magnetic field (gauss) | Time (hours) |
| --- | --- | --- | --- |
| 5 v–100 v | 0.1–5000 Hz | 0–100 | 1 hr |
| 100 v–500 v | 5 K–500 KHz | 100–500 | 2 hr |
| 500 v–5000 v | 500 K–5 MHz | 500–2000 | 2 hr |
| 5 Kv–20 Kv | 5 MHz–1 GHz | 2 K–5 K | 5 hr |
| 20 Kv–100 Kv | 1 GHz–100 GHz | 5 K–14 K | 5 hr |

Once energetically bombarded as described above to induce changes in the molecular structure of the primary material 22, the material 22 may be removed from the apparatus 20 and can be used as a tool or device to induce molecular changes in a secondary substance. As one example, a water "rejuvenation" process and apparatus for undertaking the process will be described. Not only will molecular changes achieve similar or greater purity in the water as will be effected by passing the water through a filter, a distillation process, or a treatment train, but such use of the molecularly changed primary material will also produce energy effects that cannot be obtained by any other process.

It is known that all matter in the universe takes the form of particles. Atoms are composed of heavy particles in the nucleus, with lighter electrons orbiting around the outside in discrete quantum shells. The particles are discrete, indivisible units, or quanta. Although these particles continue to be studied in depth, they cannot be measured accurately, and it is not possible to predict what they will do. Sometimes they behave like particles, sometimes like waves. However, it has been established that particles interact when they are in close proximity. This is the basis of the secondary molecular changes induced by the primary material, according to the invention. The operating principle of the apparatus for inducing secondary molecular changes in a substance or "secondary treating apparatus" is the bringing of the secondary material to be treated into close proximity to molecularly changed primary material. The implosion of the subtle electromagnetic energy fields emanating from the primary material that has been subjected to molecular changes causes a molecular change in the secondary material.

The use of molecularly changed primary material to effect molecular changes in secondary material can best be described by reference to an example of such use. For example, use of primary material that has been molecularly changed by use of the process and apparatus of the present invention has been used to induce molecular change in water. In this example, the molecular change is brought about by passing water through a tube of material containing a series of baffles, referred to as a molecular change-inducing filter or tube. The tube in its entirety has been previously subjected to primary molecular changes in accordance with the process and by use of the apparatus described above. Water passing through the molecular change-inducing filter undergoes a change in its structural composition that cannot be brought about by conventional methods aimed at purification of water. There are no limitations to the dimensions of the molecularly changed filter used in the process, nor are there any limitations to the flow rate of water, or volume of water, passing through the tube.

The device itself neither employs electricity nor magnetism. Materials that have been changed at the molecular level molecularly change other materials brought into contact, for example water, provided that there is close proximity of the interfaces. The energy fields produced within the molecularly changed tube interact with the water to cause a restructuring of the physical and energetic properties of the water. In this way, water molecules that come into contact with the molecularly changed tube become reactive at a molecular level through vibrational excitation that, in turn, affects the quantum shell around the nucleus of the molecule. This shift produces an extremely high level of energy that is the initiator of the molecular change phenomenon.

This process therefore creates high energy or concentrates natural energies at the molecular level and transmits it to the water molecules flowing through the tube, resulting in an energized, "healthy", and more "alive" water. Molecularly changed water shows a reduction in its surface tension and tastes different from either regular tap water or water that has been processed with various types of filtration or distillation apparatus. Molecularly treated water also offers an unfriendly environment for the growth and survival of pathogenic bacteria, fungi and algae. The treated water remains free from the usual contaminants since the negative oscillations of chemical toxins and heavy metals are removed by the molecular change process.

The end result of the water treatment process of the example given is that water becomes activated in a positive manner as it is restored to a pristine state, a state which it is theorized existed millions of years ago. Thus, the oscillation energy composition of the water is harmonized and restored to a more natural state, hitherto not obtained using any conventional synthetic purifying process.

The molecularly changed water becomes activated in a positive way as it is restored to a pristine state similar in many ways to unaltered water from a mountain spring. Thus, the oscillation energy composition of the water is harmonized and restored to a more natural state, hitherto not obtained using any conventional synthetic purifying process.

Below are two simple analogies that help to describe and visualize the molecular change phenomenon imparted by use of primary material molecularly changed through use of the process and apparatus of the present invention, and by specific reference to the example of use of the primary molecularly changed primary material to effect molecular changes in a secondary material, such as water.

One such analogy is to imagine that the secondary molecular change-inducing apparatus as a device containing red-colored dye. When such apparatus is suspended in a container of water, the water that comes into contact with the dye apparatus is stained red by the dye. This is seen first in the water immediately surrounding the dye container. Over time, however, the dye spreads throughout the water until all of the water is eventually dyed a uniform red color. Agitation to the water, or causing water to flow through the dye-containing apparatus, will decrease the time necessary for the water to become uniformly colored, in that the amount of water that has come into contact with the apparatus is increased. Just as water coming into contact with the dye-containing apparatus is stained red, water coming into contact with molecularly changed primary material is itself molecularly altered, until, over time, all the water in the reservoir into which the molecularly changed primary material is placed is treated. The time required to effect such change can be shortened by agitation of the water or by passing the water through the primary material.

The molecular change process can also be compared to some extent to the effects of a vibrating tuning fork. When a vibrating tuning fork is placed in close proximity to a stationary tuning fork, the vibrations from the vibrating tuning fork pass through the air to cause the previously stationary tuning fork to resonate similarly. This is detected both by the sight of the fork vibrating as well as by the sound emitted. Other stationary tuning forks placed in proximity will also be affected in the same manner and commence similar vibrations. This analogy demonstrates the principle of vibrational excitation caused by a substance coming into close proximity to a vibrationally-excited material.

Figure 2:
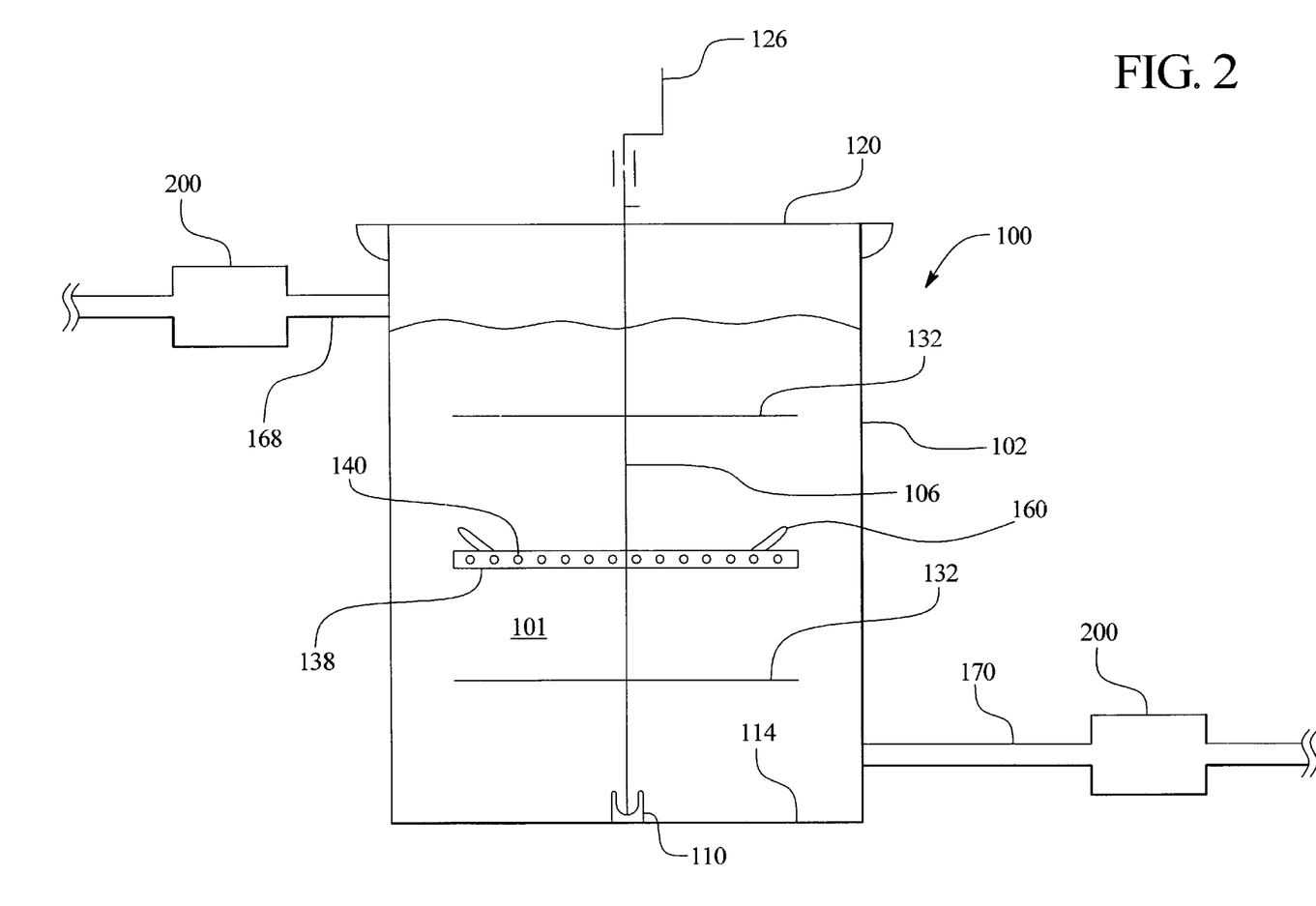
FIG. 2 is a diagrammatic sectional view of a first embodiment molecular change-inducing apparatus of the invention.
Figure 3:
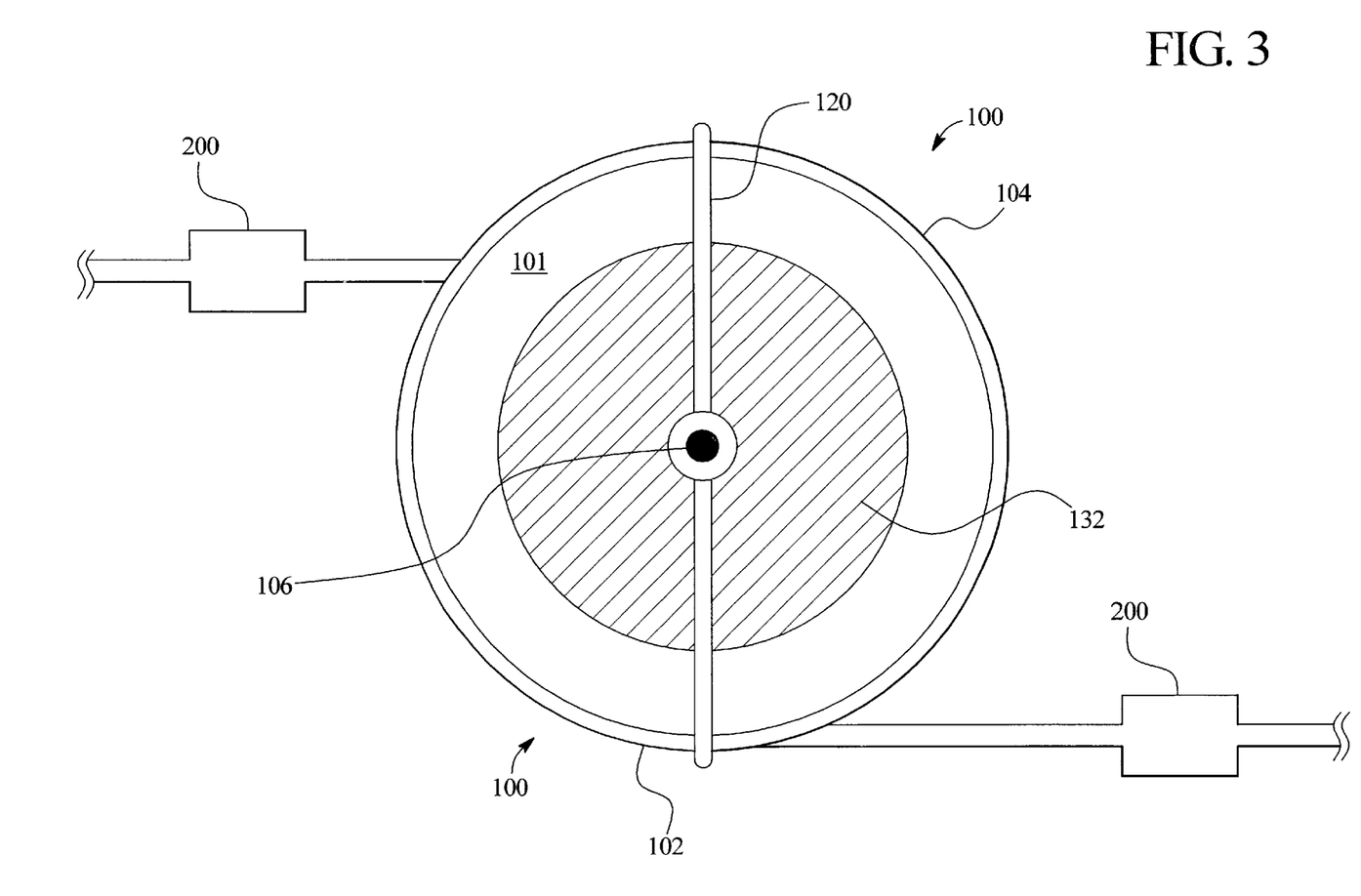
FIG. 3 is a diagrammatic plan view of the apparatus of FIG. 2.

FIGS. 2 and 3 illustrate a secondary molecular change inducing apparatus 100 wherein the secondary material is a gas or liquid. The secondary substance 101 to be molecularly changed using the secondary molecular change apparatus and process disclosed herein is contained in a holding tank 102 which can be of varying sizes. The tank may be constructed from any material such as metal, or plastic such as cross-linked medium density polyethylene. The holding tank 102 can have, for example, the dimensions of six feet in height and 4 feet in diameter. In such an example, a vertical rod 106 of about one inch in diameter and greater than six foot in length, constructed from steel or other metal of suitable strength, is arranged in a central position in the tank.

The base of the rod 106 fits into a recessed metal cup 110 in the center of a floor 114 of the tank 102, the cup 110 having a diameter slightly greater than that of the thickness of the rod, and in which it can rotate freely. The hole through which the rod projects into the upper part of the tank is located in the center of a horizontal bar 120 that spans the diameter of the tank at its upper lip and which is fixed securely to the sides of the tank. The tank may or may not have a top or lid that covers the contents. The top of the rod terminates in a crank handle 126 that can be rotated either manually or by the attachment of a motor or other power supply. The crank handle 126 can be continuous with the rod or removably attached to the upper end of the rod by a mechanism such as a grooved and sleeved device.

A number of primary molecularly changed plates or discs 132 are attached at various levels to the rod so that they remain suspended into the tank. These plates are constructed from either a ceramic material, a solid metal, or a metal mesh which can contain particles of primary molecularly changed material such as ceramic cubes or spheres. The plates 132 may be circular, rectangular or rod-shape in dimension and are attached to the central rod by a suitable mechanism, such as by holes through the center of the plates and a locking apparatus to secure them at any interval along the length of the rod.

The plates 132 may have one or more paddles or vanes 160 attached to the outer aspect of the plates so that when the plates are turned by movement of the crank handle 126, the surrounding secondary material 101 moves in a circular direction. This movement will aid in the process of molecularly changing the secondary material by causing more secondary material to come into contact with the molecularly changed discs, and by breaking up the molecularly changed secondary material that will form adjacent to the entire outer surface of each plate as the molecular change process evolves and continues.

The size of the plates 132 in this example, for use in a holding tank 102 which is four feet in diameter and six feet in height, would be three feet in diameter and two inches or more in thickness for a solid plate, and about six inches in thickness for a metal mesh container into which molecularly changed particles would be suspended.

At least one primary molecularly changed disc 132 would be used in this apparatus attached to the central rod, but more likely there would be several discs 132 attached at various levels of the rod. For example, one molecularly changed disc would be placed in the central location along the rod, that is at a depth of three feet from the top of the tank, whereas a second primary molecularly changed plate would be attached between this central plate and the top of the tank at a position eighteen inches in depth from the top of the tank. A third primary molecularly changed plate would be affixed to the rod between the centrally placed molecularly changed plate and the base of the tank at a position of four feet six inches from the top of the tank. The actual number and position of the plates attached to the central rod would depend on the level to which such tanks would be filled with secondary material. Alternatively to a solid disc 132, one or more mesh disc-shaped containers 138 holding molecularly changed beads 140 could be used. Secondary material would be introduced into the tank at a level which may be up to and above the top primary molecularly changed disc.

As a simple means of estimating the efficacy of the molecular change process when water, for example, is the secondary material undergoing treatment, and to help in determining an end point in the process, a pH meter can be attached to an outlet valve in the holding tank, or water samples can be withdrawn from the tank for pH measurement.

The pH of the sample should be taken at commencement of the process and estimates of pH change should be noted at intervals, which may be as often as every hour or as infrequent as every eight hours. An increase in pH level of the sample will indicate that the secondary molecular change process is being carried out effectively. These pH reading will become more alkaline, that is, increase in numeric value, up to a range of pH 8.0 to 9.0 or beyond.

Another relatively simple test that can be performed when water is the secondary material undergoing treatment to assess the progress of molecular change is to measure the change in its Redox potential. Other more sophisticated estimates and assays of water purification and content can be used on samples removed from the tank.

The crank handle 126 is turned either by hand or by a power source so that a circular motion is produced in the secondary material that increases surface contact between the secondary material and the molecularly changed discs. The presence of paddles or vanes 160 on the periphery of the discs would help produce and maintain the movement of water. If a power source is available to turn the crank handle, this can be run at a slow revolution for about one hour, and restart after a one-hour break. This duty cycle of one hour on and one hour off can continue for the entire period during which the secondary material is undergoing treatment. If the crank handle is to be turned manually, then it can be rotated at intervals that are convenient to those operating the system (s).

The time necessary to induce molecular change of the secondary material in a holding tank of the dimension described above is about twelve hours, but this time interval is not critical. The tank can be filled with secondary material when convenient and be ready to empty any time after the twelve hour period has elapsed. When it has been estimated that sufficient molecular change of the secondary material has occurred, such material is evacuated from the holding tank and replaced by another quantity of untreated secondary material which is to be molecularly changed by the same process.

It is not necessary to empty the holding tank completely before adding more secondary material to be molecularly changed. What constitutes "sufficient molecular change" will depend on the nature of the secondary material, and the purpose for which the secondary material is to be used.

Molecular change filters 200 should be employed. These molecular change filters are described below and should be placed in the incoming material supply 168 to the holding tank, and in the outgoing material supply tube 170 coming from the holding tank, or both.

Figure 4:
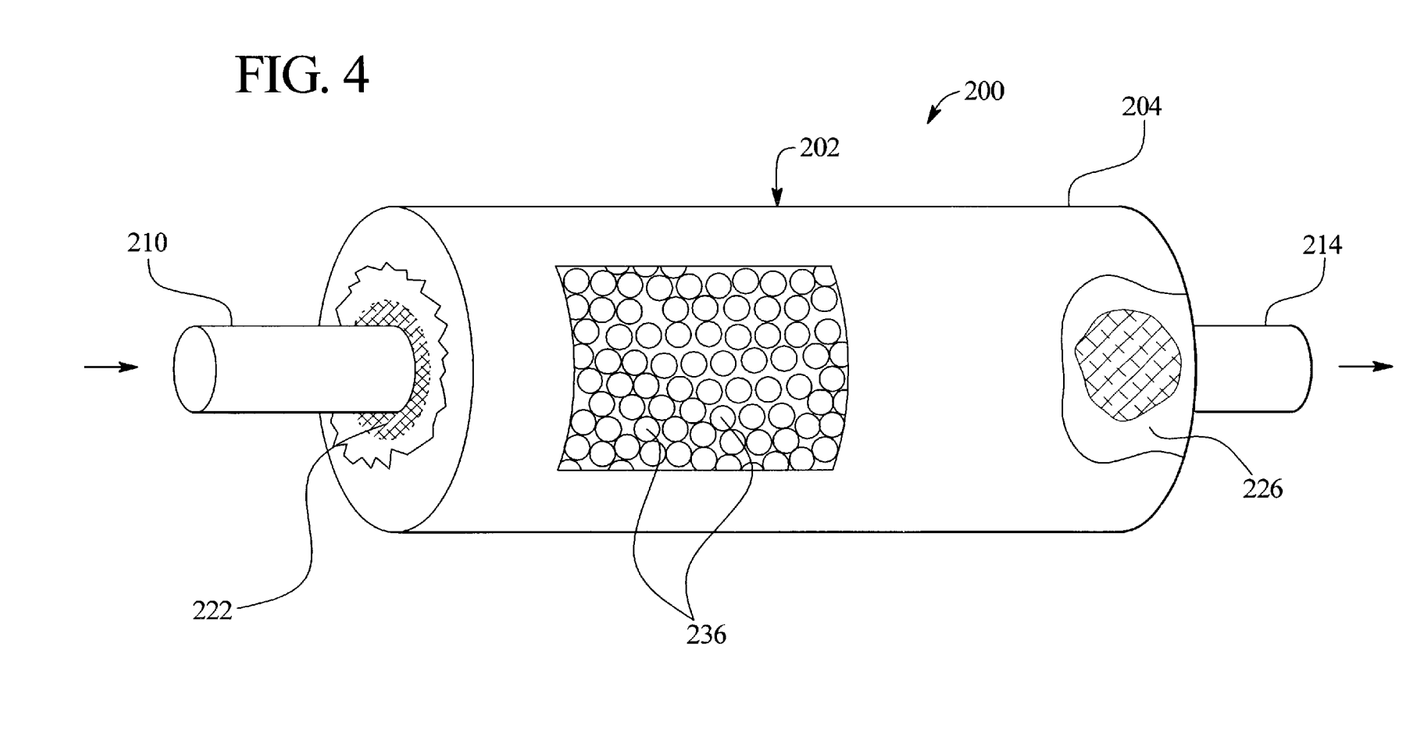
FIG. 4 is a diagrammatic, fragmentary perspective view of a molecular change treatment apparatus of the invention.

FIG. 4 illustrates a molecular change filter 200. The filter 200 includes a body 202 formed by a molecularly changed tube 204 about twenty-four inches in length and about twelve inches in diameter substantially closed at its opposite ends. The filter 200 has an entry nozzle 210 at the center of one end, and an exit nozzle 214 at the other end, each being about three inches in diameter and four inches in length. These nozzles are used for connection to a pipe containing the incoming source of secondary material and, after passing through the molecular change filter, to the outgoing secondary change supply going, for example, to the holding tank 102 previously described. Different diameter entry and exit nozzles can be used depending on local requirements.

A first mesh filter 222, preferably composed of stainless steel, is placed between the entry nozzle 210 and the internal aspect of the filter, and a second filter 226, preferably composed of stainless steel, is placed between the internal aspect of the filter and the exit nozzle. The mesh filters placed between the entry nozzle 210 and the body 202 of the filter, and the exit nozzle 214 and the body 202 of the filter prevent the molecularly changed primary material, such as ceramic beads, from escaping from the body of the molecularly changed filter. The body of the filter contains, and is packed with molecularly changed primary material, such as, for example, ceramic beads or spheres 236 having diameters which vary from 0.1–1.5 inches.

Although this apparatus and method describes a commercial system for the molecular change of secondary material, a scaled-down version can be easily employed for personal or domestic use. This can be used on, for example, the main incoming water supply to a house so that all water systems within the house will supply molecularly changed water. As a further example of personal use, alternatively, a small under sink device can be employed to molecularly change water that flows through that particular faucet system. With these scaled-down versions, a similarly scaled-down molecular change filter should be supplied on the outgoing pipe from the device into the house. At the very least, a conventional filter containing, for example, a molecular sieve, should be supplied through which the water supply will flow from the device to either the house or particular faucet system.

As a further use of the molecularly changed filter described above, the example of attachment of such a filter to the outgoing side of a pool pump filter is given. Such use will keep the water in a swimming pool in a clean and relatively bacteria and algae free condition without the necessity for using acids such as muriatic acid, and halogenated agents such as chlorine or bromine. This system works effectively and efficiently irrespective of the size of the swimming pool. The molecular filter nozzles 210 and 214 that are used for connection to the tubing are sized in relation to the pool filter pump. The molecularly changed filter is therefore placed within the outgoing water supply path coming from the pump to the swimming pool. The body of the molecularly changed filter is packed with molecularly changed primary material, such as ceramic beads or spheres of varying diameter. Two mesh filters are used. One is placed between the entry nozzle and the internal aspect of the filter, and the other is placed between the internal aspect of the filter and the exit nozzle. These are affixed to the internal walls so that they are placed directly over, and cover completely, the incoming and outgoing nozzles. The steel mesh filters, placed between the entry and exit nozzles and the body of the filter, prevent the molecularly changed primary material from escaping from the body of the molecularly changed filter.

During construction of the molecularly changed filter, it would be subjected to the primary molecular change-inducing apparatus 20 of the invention, and subsequently would be effective to induce secondary molecular changes to the water supply for the swimming pool. The same techniques can be applied to Jacuzzi's and hot tubs.

Experimental Results

An experiment was carried out by the inventor using a prototype of this molecularly changed filter. The filter used was less sophisticated than the one described above in this invention and consisted of a simple metal tube as the primary material which had previously been molecularly changed according to the following protocol.

The metal tube, a steel tube, which weighed approximately 40 pounds, was contained in a closed aluminum chamber approximately seven feet in length and two feet in width. The tube was subjected to electrical AC voltage at 60 Hz., which was constantly ramped up over a four-hour period from zero volts to a maximum of about 500 volts. An array of electromagnets was arranged in the chamber surrounding the tube and supplied a magnetic field to the tube, which was constantly ramped up from zero gauss to 150 gauss, during this four-hour period. During the four-hour period, the tube was exposed to vibration of about 30 Hz.

The so-treated tube was placed into the outgoing water flow from the filter pump to the swimming pool and was approximately 24 inches in length and six inches in diameter. The metal tube was completely open throughout its length and contained no inclusions.

In this experiment, a large swimming pool was employed, having dimensions of 35 feet by 30 feet with a depth varying from two feet to six feet in the main area, and with an attached diving area of twelve feet by twenty feet with a depth of ten feet.

With this particular swimming pool, calorimetric analyses (dye tests) were used on a daily basis in order to test the degree of contamination of pool water and to determine the time at which to add chemicals. As a result of this analysis, it had been standard practice to add chemicals to the pool every third day in order to maintain it in a condition suitable for use, that is without yellow discoloration due to a change in pH, build up of contaminants, bacteria and algae.

After two days use of the molecularly changed filter, the pool water did not turn cloudy with signs of yellow discoloration nor did the pH of the water change. In fact, it became clear and sparkling in nature, much cleaner than at any previous time during previous use of the pool even with the constant addition of chemicals. Swimming proved to be more pleasant since there was no irritation to the eyes that inevitably occurred when chemicals were added, and no chemical smell that always appeared to stay with the swimmer for long periods.

The experiment was continued for a five-month period. Colorimetric analysis of the water was carried out on a daily basis and confirmed the stable pH, and clean and uncontaminated nature of the water. During the five month period that the molecularly changed filter was attached to the filter pump flow system, the pool water was maintained at this clear and sparkling level. At no time were chemicals added to the water. The results were clear and unequivocal with respect to the efficacy of the molecularly changed filter.

The molecularly changed pool filter described in this section of the invention, being an improvement on what was used in the above experiment, will be at least as effective, if not more so, than that used in the above experiment. The inclusion of ceramic beads or spheres in the molecularly changed filter will enhance the degree of molecular change achieved.

Other Potential Uses and Benefits of Molecular Change Process and Apparatus

The use of molecularly changed filters used in automobile engines should prove to have a significant effect in increased efficiency and therefore make the vehicle more power and energy efficient. The use of molecularly changed gas tanks in vehicles will also have the effect of decreasing gas consumption. This will apply to both diesel and gasoline fuels due to greater efficiencies of use. The effect will increase the number of miles per gallon irrespective of the type of gasoline used or the type of vehicle being utilized. Both of the above are highly relevant considering the high price of petroleum by-products and the huge use of gasoline in industrialized countries such as the United States. It would also make the U.S. and other countries less reliant on oil producing countries.

Molecular changes of natural gas lines should also have similar effects on the gas passing through the pipes leading to more efficient usage and reductions in costs.

The above-applied technologies could mean huge financial savings to nations as a whole and especially to individuals.

The production of molecularly changed primary material, using the process and apparatus described above, for use in inducing changes in secondary material or substances can have far ranging uses including: use of the primary material in biological treating apparatus for plants or animals, including humans, use of the primary material in thermal apparatus including hairdryers, lamps for treating living tissue, saunas.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A method of treating a substance comprising the steps of:
    supplying a work material;
    using at least one radiation source, radiating said material to alter the atomic configuration of the material and vibrating said work material during radiation by said radiation source; and
    thereafter, placing said substance to be treated in proximity to said work material to be exposed to said work material.

2. The method according to claim 1, wherein said step of supplying a work material is further defined in that said work material comprises ceramic beads.

3. The method according to claim 1, wherein said step of using at least one radiation source is further defined in that both a laser radiation source and a far-infrared radiation source are used to radiate said work material.

4. The method according to claim 1, comprising the further step of elevating the temperature of said material before radiating said material.

5. The method according to claim 1, comprising the further step of subjecting said material to a magnetic field during radiation of said material.

6. The method according to claim 1, wherein said step of supplying a work material is further defined in that said work material comprises a ceramic material.

7. The method according to claim 1, wherein said step of using at least one radiation source comprises using a laser, said laser comprising a $CO_2$ laser adapted to radiate at 10.6 $\mu$m and 9.6 $\mu$m.

8. The method according to claim 1, wherein said step of using at least one radiation source comprises using a laser, said laser comprising a CO laser adapted to radiate at 5–6.2 $\mu$m.

9. The method according to claim 1, wherein said step of using at least one radiation source comprises using a laser, said laser comprising a $YAG.Nd^{+3}$ solid state laser adapted to radiate at 1 $\mu$m.

10. The method according to claim 1, wherein said step of using at least one radiation source comprising using a laser, said laser emitting a laser beam which is swept over a surface of said work material.

11. The method according to claim 10, wherein said step of using at least one radiation source also comprises using a source of far-infrared radiation.

12. The method according to claim 1, wherein said substance comprises a fluid, and said work material comprises a solid, and said step of placing said substance in proximity to said work material is further defined in that said substance flows over said work material to be treated thereby.

13. The method according to claim 12, wherein said substance comprises water, and said work material comprises pellets, said pellets emitting far-infrared radiation to remove the contaminants from said substance.

14. A system for treating a substance using a work material, comprising:
    a first apparatus for altering an atomic structure of a work material, the apparatus including a source of radiation for radiating said work material to create a molecularly altered work material, wherein said first apparatus comprises a laser, said laser arranged to radiate onto a surface of said work material; and
    a second apparatus for holding altered work material in the proximity to a supply of said substance, wherein said substance receives energy from said work material.

15. The system according to claim 14, wherein said first apparatus comprises a support surface for supporting said work material, and a vibratory driver connected to said support surface for vibrating said work material during radiation.

16. A system according to claim 14, wherein said first apparatus includes a heater for raising the temperature of said work material prior to radiating.

17. The system according to claim 14, wherein said substance comprises a fluid and said work material comprises at least one solid body, and said second apparatus comprises a housing for containing said fluid in close proximity to said solid body.

18. The system according to claim 17, wherein said work material comprises a plurality of pellets contained by said housing and said fluid is channeled by said housing to permeate through said pellets.

19. The system according to claim 17, wherein said work material comprises a plurality of disc-shaped elements and said fluid flows over said elements.

20. The system according to claim 19, comprising a mesh container wherein at least one of said disc-shaped elements comprises a plurality of pellets held within said mesh container.

21. A method of treating a substance comprising the steps of:

supplying a work material;

using at least one radiation source, radiating said material to alter the atomic configuration of the material; and thereafter, placing said substance to be treated in proximity to said work material to be exposed to said work material, wherein said substance comprises water, and said work material comprises pellets, said pellets emitting far-infrared radiation to remove the contaminants from said substance, and said step of placing said substance in proximity to said work material is further defined in that said substance flows over said work material to be treated thereby.

22. A system for treating a substance using a work material, comprising:

a first apparatus for altering an atomic structure of a work material, the apparatus including a source of radiation for radiating said work material to create a molecularly altered work material, wherein said first apparatus comprises a support surface for supporting said work material, and a vibratory driver connected to said support surface for vibrating said work material during radiation; and a second apparatus for holding altered work material in the proximity to a supply of said substance, wherein said substance receives energy from said work material.

23. A system for treating a substance using a work material, comprising:

a first apparatus for altering an atomic structure of a work material, the apparatus including a source of radiation for radiating said work material to create a molecularly altered work material, wherein said first apparatus includes a heater for raising the temperature of said work material prior to radiating; and a second apparatus for holding altered work material in the proximity to a supply of said substance, wherein said substance receives energy from said work material.

24. A system for treating a substance using a work material, comprising:

a first apparatus for altering an atomic structure of a work material, the apparatus including a source of radiation for radiating said work material to create a molecularly altered work material; and a second apparatus for holding altered work material in the proximity to a supply of said substance, wherein said substance receives energy from said work material, wherein said substance comprises a fluid and said work material comprises at least one solid body, and said second apparatus comprises a housing for containing said fluid in close proximity to said solid body.

25. The system according to claim 24, wherein said work material comprises a plurality of pellets contained by said housing and said fluid is channeled by said housing to permeate through said pellets.

26. The system according to claim 24, wherein said work material comprises a plurality of disc-shaped elements and said fluid flows over said elements.

27. The system according to claim 26, comprising a mesh container wherein at least one of said disc-shaped elements comprises a plurality of pellets held within said mesh container.

* * * * *